United States Patent
Kim

(10) Patent No.: US 8,580,417 B2
(45) Date of Patent: Nov. 12, 2013

(54) ELECTRODE ASSEMBLY AND SECONDARY BATTERY HAVING THE SAME

(75) Inventor: Jinhee Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 386 days.

(21) Appl. No.: 12/073,550

(22) Filed: Mar. 6, 2008

(65) Prior Publication Data

US 2008/0274398 A1 Nov. 6, 2008

(30) Foreign Application Priority Data

May 3, 2007 (KR) .................. 10-2007-0043042

(51) Int. Cl.
*H01M 2/14* (2006.01)
*H01M 2/16* (2006.01)
*H01M 2/18* (2006.01)
*H01M 10/052* (2010.01)

(52) U.S. Cl.
USPC ............ 429/129; 429/142; 429/144; 429/145

(58) Field of Classification Search
USPC .................................. 429/122–255
See application file for complete search history.

(56) References Cited

U.S. PATENT DOCUMENTS

| | | | | |
|---|---|---|---|---|
| 4,269,907 A | * | 5/1981 | Momyer et al. | 429/67 |
| 5,639,568 A | * | 6/1997 | Pedicini et al. | 429/27 |
| 5,728,490 A | * | 3/1998 | Edgington et al. | 429/235 |
| 5,981,107 A | * | 11/1999 | Hamano et al. | 429/231.95 |
| 6,287,720 B1 | * | 9/2001 | Yamashita et al. | 429/131 |
| 6,322,923 B1 | * | 11/2001 | Spotnitz et al. | 429/144 |
| 6,432,586 B1 | * | 8/2002 | Zhang | 429/251 |
| 2002/0041999 A1 | * | 4/2002 | Moutsios et al. | 429/224 |
| 2002/0055038 A1 | * | 5/2002 | Aihara et al. | 429/142 |
| 2002/0142211 A1 | * | 10/2002 | Nakanishi et al. | 429/94 |
| 2003/0157409 A1 | * | 8/2003 | Huang | 429/306 |
| 2005/0221173 A1 | * | 10/2005 | Tatebayashi et al. | 429/161 |
| 2007/0072083 A1 | * | 3/2007 | Ikuta et al. | 429/246 |

FOREIGN PATENT DOCUMENTS

| | | |
|---|---|---|
| CN | 1520177 A | 9/2004 |
| JP | 11-260418 A | 9/1999 |
| JP | 2006-338993 | 12/2006 |
| JP | 2006-338993 A | 12/2006 |
| KR | 100137304 B1 | 2/1998 |
| KR | 1020010001828 A | 1/2001 |
| KR | 1020050031307 A | 4/2005 |
| KR | 1020060059698 A | 6/2006 |
| KR | 100627340 B1 | 9/2006 |
| WO | WO 2005057691 A1 * | 6/2005 |

* cited by examiner

*Primary Examiner* — Jonathan Crepeau
*Assistant Examiner* — Jacob Buchanan
(74) *Attorney, Agent, or Firm* — Robert E. Bushnell, Esq.

(57) ABSTRACT

An electrode assembly and a secondary battery including the same. The electrode assembly is constructed with a positive electrode plate including a positive electrode coating portion, a negative electrode plate including a negative electrode coating portion, a separator interposed between the positive electrode plate and the negative electrode plate, and at least one mesh layer disposed on at least one of the positive electrode plate and the negative electrode plate. The mesh layer is wider than either the positive electrode coating portion or the negative electrode coating portion to prevent a detachment of either the positive electrode coating portion or the negative electrode coating portion. Since the mesh layer prevents the detachment of the electrode coating portions when subjected to an external impact, it is possible to improve the stability and reliability of a battery.

11 Claims, 2 Drawing Sheets

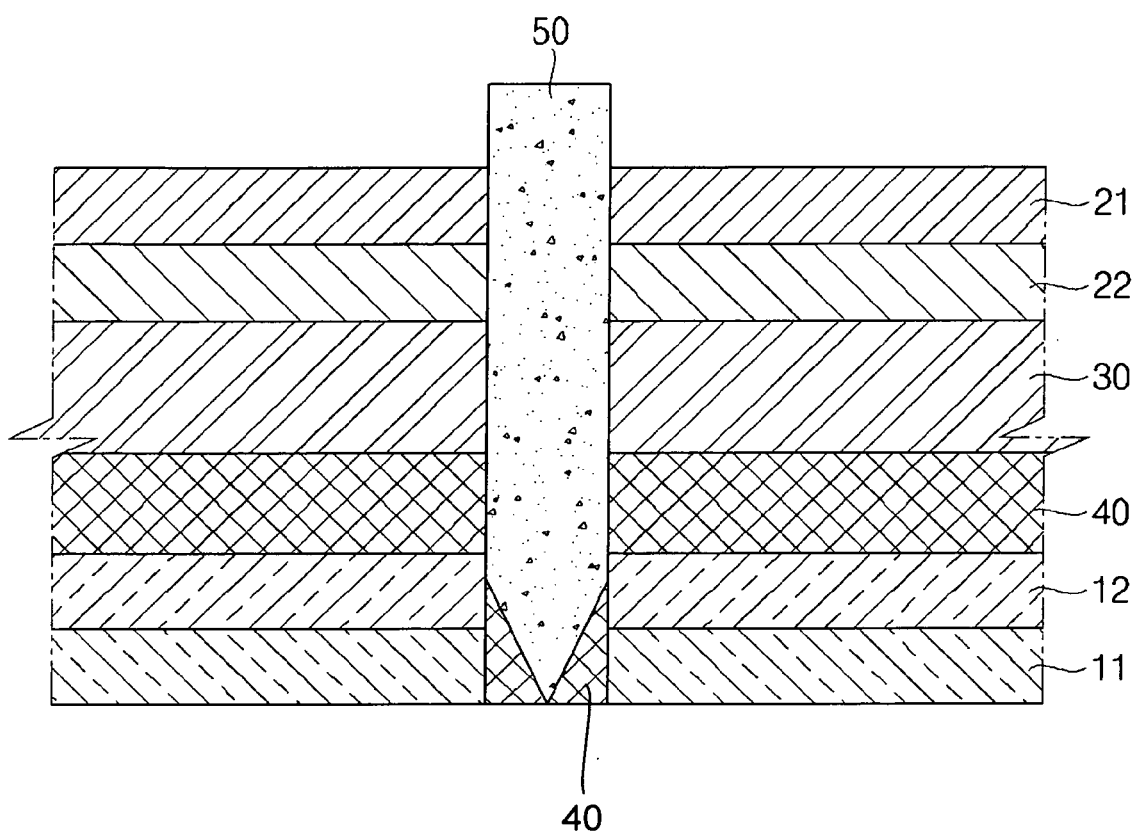

ELECTRODE ASSEMBLY AND SECONDARY BATTERY HAVING THE SAME

CLAIM OF PRIORITY

This application makes reference to, incorporates the same herein, and claims all benefits accruing under 35 U.S.C. §119 from an application for ELECTRODE ASSEMBLY AND SECONDARY BATTERY HAVING THE SAME earlier filed in the Korean Intellectual Property Office on the 3 May 2007 and there duly assigned Serial No. 10-2007-0043042.

BACKGROUND OF THE INVENTION

1. Field of the Invention

The present invention relates to an electrode assembly and a secondary battery having the same, and more particularly, to an electrode assembly having high stability and reliability and a secondary battery having the same.

2. Description of the Related Art

In general, secondary batteries, unlike primary batteries, are rechargeable and have been used intensively as main power of, for example, communication apparatuses, information processing apparatuses, and audio/video portable apparatuses. In recent years, the secondary batteries have drawn attention and have been rapidly developed because they have a very light weight, a high energy density, a high output voltage, a low discharge rate, and a long life span and are eco-friendly.

The secondary batteries are classified into nickel-metal hydride (Ni-MH) batteries and lithium ion (Li-ion) batteries according to the type of electrode active materials. In particular, the lithium ion batteries may be divided into a lithium ion battery using a liquid electrolyte and a lithium ion battery using a solid polymer electrolyte or a gel-type electrolyte according to the type of electrolyte. In addition, the batteries are classified into a can-type battery and a pouch-type battery according to the shape of a container for accommodating an electrode assembly.

Since the lithium ion battery has a considerably higher energy density per weight than that of the primary battery, the lithium ion battery can be manufactured as a super-light weight battery. In addition, in the lithium ion battery, the average voltage of each cell is 3.6 V, which is three times higher than the average voltage 1.2 V of other secondary batteries, such as a nickel-cadmium battery and a nickel-metal hydride battery. And, the lithium ion battery has a discharge rate of less than approximately 5% per month at a temperature of 20° C., which is one third of the discharge rate of a nickel-cadmium battery and a nickel-metal hydride battery. In addition, since the lithium ion battery does not use a heavy metal, such as cadmium (Cd) or mercury (Hg), it is an eco-friendly battery, and the lithium ion battery can be charged and discharged 1000 times in a normal state. For these reasons, in recent years, the lithium ion battery has been rapidly developed with the development of information and communication technologies.

In a secondary battery according to the related art, an electrode assembly including a positive electrode plate, a negative electrode plate, and a separator is housed in a can made from aluminum or aluminum alloy, a cap assembly is provided on an upper part of the can to close up an upper opening of the can, an electrolyte is injected into the can through an electrolyte injection hole, and the electrolyte injection hole is closed up, thereby forming a bare cell. The positive electrode plate is coated with a positive electrode coating portion made from positive active materials, and the negative electrode plate is coated with a negative electrode coating portion made from negative active materials. When the can is made from aluminum or aluminum alloy, the weight of the battery can be reduced since aluminum is a light material, and there is an advantage that the battery is not corroded even when it is used in a high-voltage environment for a long time.

A sealed unit bare cell is connected to safety devices, such as a PTC (Positive Temperature Coefficient) device, a thermal fuse, and a Protective Circuit Module (PCM), and other battery accessories in a separate hard pack, or it is molded with a hot-melt resin. In this way, the outer appearance of the battery is formed.

Meanwhile, the separator of the electrode assembly is provided between the positive electrode plate and the negative electrode plate to prevent a short circuit between the positive electrode plate and the negative electrode plate. The separator also serves as a safety device for preventing the overheating of the battery.

When the battery is overcharged or frequently charged and discharged, however, a silver white lithium dendrite may be deposited on the surface of negative electrode active materials, and the lithium dendrite may pass through the separator such that the positive electrode active materials contact the negative electrode active materials, which results in a short circuit between the positive and negative electrode active materials.

In addition, when a nail passes through the battery during a nail penetration test, which is a safety test for testing an internal short circuit, the active materials may be detached from collectors, and the positive electrode active materials and the negative electrode active materials detached from the collectors may contact each other, resulting in a short circuit.

Further, when the electrodes are wound together, the adhesion between the collectors and the electrode coating portions being lowered due to repeated expansion and shrinkage of the electrode plates caused by charge and discharge, the electrode coating portions may be cracked and are likely to be detached from the collectors. When the positive and negative electrode active materials are detached from the corresponding collectors, a short circuit occurs between the positive electrode active materials and the negative electrode active materials due to the contact between the positive electrode active materials and the negative electrode active materials, which lowers the stability and reliability of the battery.

Therefore, when the adhesion between electrode coating portions and the electrode collectors is lowered, it is necessary to change the structure of the electrode assembly to prevent the detachment of the electrode coating portions.

SUMMARY OF THE INVENTION

It is therefore an object of the present invention to provide an improved secondary battery with an improved electrode assembly.

It is another object of the present invention to solve the above-described drawbacks.

It is still another object of the present invention to provide an improved electrode assembly capable of preventing the detachment of electrode coating portions when subjected to an external impact and improving the stability and reliability of a battery and a secondary battery having the same.

In order to accomplish the aspect of the present invention, according to an aspect of the invention, an electrode assembly is constructed with a positive electrode plate including a positive electrode coating portion, a negative electrode plate including a negative electrode coating portion, a separator interposed between the positive electrode plate and the negative electrode plate, and at least one mesh layer disposed on at least one of the positive electrode plate and the negative electrode plate. The mesh layer is wider than either the positive electrode coating portion or the negative electrode coating portion to prevent a detachment of either the positive electrode coating portion or the negative electrode coating portion.

The mesh layer may be made from nylon, urethane, or a mixture thereof.

The mesh layer may have a thickness of approximately 3 μm to approximately 20 μm.

Meshes of the mesh layer may have diamond shapes.

The length of one side of the mesh may be less than 5 mm.

An adhesive substance may be applied on the edge of the mesh layer, and the mesh layer may be laminated on the positive electrode plate or the negative electrode plate.

The mesh layer may contact the separator by winding.

According to another aspect of the invention, a secondary battery is constructed with an electrode assembly, a can, and a cap assembly. The electrode assembly is constructed with a positive electrode plate including a positive electrode coating portion, a negative electrode plate including a negative electrode coating portion, a separator interposed between the positive electrode plate and the negative electrode plate, and at least one mesh layer disposed on at least one of the positive electrode plate and the negative electrode plate. The mesh layer is wider than either the positive electrode coating portion or the negative electrode coating portion to prevent a detachment of either the positive electrode coating portion or the negative electrode coating portion.

The mesh layer may be made from nylon, urethane, or a mixture thereof, and the mesh layer may have a thickness of approximately 3 μm to approximately 20 μm. Furthermore, meshes of the mesh layer may have diamond shapes, and the length of one side of the mesh may be less than mm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein:

FIG. 2 is a diagram illustrating the electrode assembly penetrated by a nail according to the embodiment of the principles of the invention.

DETAILED DESCRIPTION OF THE PREFERRED INVENTION

Figure 1:
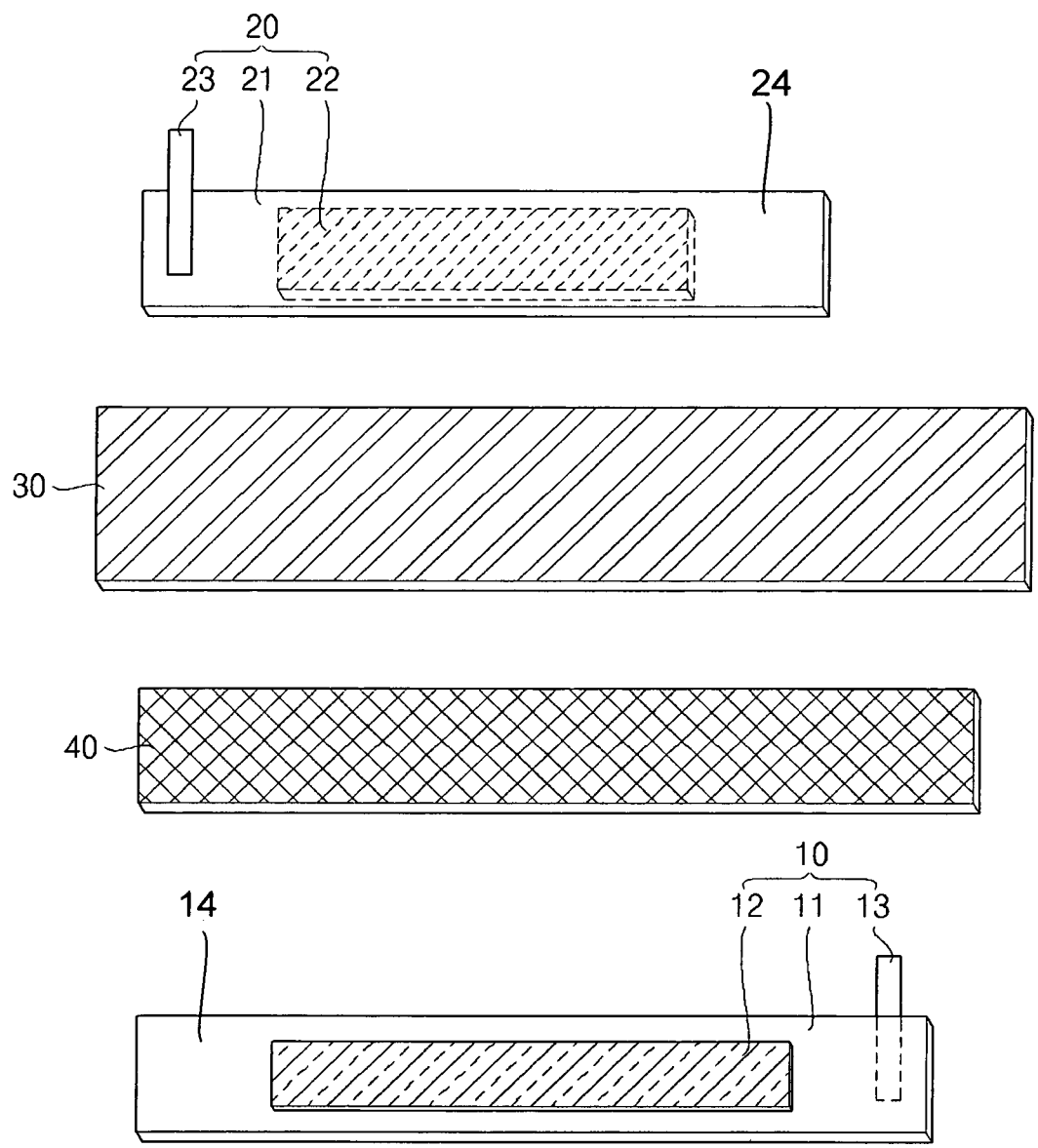
FIG. 1 is an exploded perspective view illustrating an electrode assembly according to an embodiment of the principles of the invention.

Hereinafter, an electrode assembly according to an exemplary embodiment of the invention will be described in detail with reference to the accompanying drawings.

As shown in FIG. 1, an electrode assembly according to an embodiment of the principles of the present invention is constructed with a positive electrode plate 10, a negative electrode plate 20, a separator 30 which is interposed between positive electrode plate 10 and negative electrode plate 20 to prevent a short circuit between positive electrode plate 10 and negative electrode plate and is capable of moving only lithium ions, and a mesh layer 40 laminated on positive electrode plate 10 or negative electrode plate 20. A laminated structure of positive electrode plate 10, mesh layer 40, separator 30, and negative electrode plate 20 is spirally wound.

Positive electrode plate 10 includes a positive electrode collector 11, a positive electrode coating portion 12, and a positive electrode tap 13.

Positive electrode collector 11 is made from a thin aluminum foil. Positive electrode coating portion 12 is made from a positive electrode active material consisting essentially of a lithium-based oxide and is formed on both surfaces of positive electrode collector 11. In this case, a lithium oxide, such as $LiCoO_2$, $LiMn_2O_4$, $LiNiO_2$, or $LiMnO_2$, is used as the positive electrode active material. In addition, positive electrode non-coating portions 14, on which the positive electrode active material is not coated, are formed at both ends of positive electrode collector 11 at predetermined intervals.

Positive electrode tap 13 is securely attached to a portion of positive electrode non-coating portion 14, such that positive electrode tap 13 is disposed in an inner circumferential portion of the electrode assembly after the spiral winding of the laminated structure of positive electrode plate 10, mesh layer 40, separator 30, and negative electrode plate 20 by ultrasonic welding or laser welding. Positive electrode tap 13 is made from a nickel-metal material, and the upper part of positive electrode tap 13 is securely attached to the upper part of positive electrode collector 11 and protrudes from the upper part of positive electrode collector 11.

Negative electrode plate 20 includes a negative electrode collector 21, a negative electrode coating portion 22, and a negative electrode tap 23.

Negative electrode collector 21 is made from a thin copper foil. Negative electrode coating portion 22 is made from a negative electrode active material consisting essentially of carbonic materials and is formed on both surfaces of negative electrode collector 21. In this case, for example, a carbon (C)-based material, Si, Sn, a tin oxide, a composite tin alloy, or a transition metal oxide is used as the negative electrode active material. In addition, negative electrode non-coating portions 24, on which the negative electrode active material is not coated, are formed at both ends of negative electrode collector 21.

Negative electrode tap 23 is made from a nickel-metal material, and is securely attached to a portion of negative electrode non-coating portions 24, such that negative electrode tap 23 is disposed in an inner circumferential portion after the spiral winding of the laminated structure of positive electrode plate 10, mesh layer 40, separator 30, and negative electrode plate 20 by ultrasonic welding. Negative electrode tap 23 is securely attached to an upper part of negative electrode collector 21 so that the upper part of negative electrode tap 23 protrudes from the upper part of negative electrode collector 21.

Separator 30 is generally made from polyethylene (PE) resin, or polypropylene (PP) resin. Alternatively, separator 30 may be made from a general insulating tape. In addition, separator 30 is formed to have a larger width than those of positive electrode plate 10 and negative electrode plate 20, thereby preventing a short circuit between positive electrode plate 10 and negative electrode plate 20.

Mesh layer 40 is a mesh-shaped fibrous tissue, and is formed to be wider than positive electrode coating portion 12 and negative electrode coating portion 22 to suppress the growth of a lithium dendrite that is likely to be generated on the surface of the electrode plates.

An adhesive substance is applied on the edge of mesh layer 40, such that mesh layer 40 is adhered on positive electrode plate 10 or negative electrode plate 20 and may be planarized through a drying process. In this case, mesh layer 40 may contact separator 30 by winding.

That is, in this embodiment, mesh layer 40 may be laminated on the electrode plate so as to be integrated with the electrode coating portion and contact separator 30 by winding.

Mesh layer 40 is made from nylon, urethane, or a mixture thereof, and elastically covers positive electrode plate 10 or negative electrode plate 20, so that it can prevent the electrode active materials from being detached from the electrode collector by an external force. In addition, as shown in FIG. 2, when a nail 50 passes through the battery, mesh layer 40 is extended with nail 50, which makes it possible to minimize the combustion and explosion of a battery due to an internal short circuit.

Meanwhile, as mesh layer 40 becomes thicker, mesh layer 40 occupies a large internal area of the battery, which may cause a large capacity loss per volume in the battery. In addition, mesh layer 40 having a large thickness prevents the expansion or contraction of the electrode plate, which results in a reduction in the life span of the battery. Therefore, preferably, mesh layer 40 has a thickness of approximately 3 μm to approximately 20 μm in order to achieve high stability and performance.

The following Table 1 summarizes initial capacities, nail penetration test results, and life spans of batteries manufactured with various electrodes.

In Table 1, in a penetration test, a nail completely passes through a battery charged with a voltage of 4.35 V, and then it is checked whether combustion and explosion occur in the battery. If the combustion and the explosion do not occur in the battery, the penetration result of the battery is represented by "OK". On the other hand, if the combustion and the explosion occur in the battery, the penetration result of the battery is represented by "NG". Meanwhile, from the viewpoint of the life span of a battery, the battery is charged with 1 C and 4.2 V and is discharged with 1 C and 3 V. If the capacity of the battery that has been charged and discharged 500 times, is equal to or more than 80% of the initial capacity, the life span of the battery is represented by "OK". On the other hand, if the capacity of the battery is less than 80% of the initial capacity, the life span of the battery is represented by "NG". In addition, mesh layer 40 should have a thickness of less than 20 μm to reduce the capacity loss of the battery due to mesh layer 40. If the thickness of mesh layer 40 is less than 20 μm, the initial capacity result of the battery is represented by "OK". Otherwise, if the thickness of mesh layer 40 is larger than 20 μm, the initial capacity result of the battery is represented by "NG".

In the batteries of comparative example 2 to comparative example 8 in the following Table 1, the length of one side of a diamond-shaped mesh is 1 mm.

TABLE 1

| | | Existence of mesh on surface of electrode | | Performance of battery | | |
| --- | --- | --- | --- | --- | --- | --- |
| | Thickness of mesh layer | Positive electrode plate | Negative electrode plate | Initial capacity | Penetration | Life span |
| Comparative example 1 | — | Absent | Absent | OK | NG | OK |
| Comparative example 2 | 25 μm | Present | Present | NG | OK | NG |
| Comparative example 3 | 2 μm | Present | Present | OK | NG | OK |
| Example 1 | 20 μm | Present | Present | OK | OK | OK |
| Example 2 | 10 μm | Present | Present | OK | OK | OK |
| Example 3 | 5 μm | Present | Present | OK | OK | OK |
| Example 4 | 3 μm | Present | Present | OK | OK | OK |
| Example 5 | 20 μm | Present | Absent | OK | OK | OK |
| Example 6 | 3 μm | Present | Absent | OK | OK | OK |
| Example 7 | 20 μm | Absent | Present | OK | OK | OK |
| Example 8 | 3 μm | Absent | Present | OK | OK | OK |

In Comparative example 1, the battery is manufactured with a positive electrode plate, a negative electrode plate, and a separator made from a polyolefin film.

In Comparative example 2, the battery is manufactured with the same electrodes as those in Comparative example 1. A mesh layer having a thickness of 25 μm is laminated on both of the positive electrode plate and the negative electrode plate.

In Comparative example 3, the battery is manufactured with the same electrodes as those in Comparative example 1. A mesh layer having a thickness of 2 μm is formed on both of the positive electrode plate and the negative electrode plate. The batteries in Comparative example 2 and 3 are the same as the battery in Comparative example 1, except the mesh layers as described above.

In the battery of Comparative example 1, the penetration result is NG. That is, a nail passes through the battery inside, and the positive electrode active materials and the negative electrode active materials are detached from the collectors, which causes a short circuit between the positive electrode plate and the negative electrode plate, resulting in an explosion of the battery.

Because the battery of Comparative example 2 is constructed with the mesh layers for preventing the positive and negative electrode active materials from being detached from the positive electrode collector and the negative electrode collector, respectively, the penetration result is OK, but both of the initial capacity and the life span of the battery of Comparative example 2 are NG due to a thick thickness.

The battery of Comparative example 3 is constructed with the mesh layers formed on both the positive electrode plate and the negative electrode plate, but the mesh layers are too thin to completely prevent the detachment of the active materials from the electrode collectors. Therefore, the penetration result is NG.

In the batteries of Examples 1 to 4, the mesh layers for preventing the detachment of the active materials are laminated on both of the positive electrode plate and the negative electrode plate with a thicknesses of 20 μm, 10 μm, 5 μm, and 3 μm, respectively. The initial capacities, the penetration results, and the life spans of the batteries according to Embodiments 1 to 4 are all OK.

has been charged and discharged 500 times is equal to or more than 80% of the initial capacity, the life span of the battery is represented by "OK". On the other hand, if the capacity of the battery is less than 80% of the initial capacity, the life span of the battery is represented by "NG".

TABLE 2

|  | Size of mesh (length of one side of mesh) Thickness of mesh | Existence or nonexistence of mesh on surface of electrode | | Performance of battery | | |
|---|---|---|---|---|---|---|
|  |  | Positive electrode plate | Negative electrode plate | Initial capacity | Penetration | Life span |
| Comparative example 1 | 7 mm | Present | Present | OK | NG | OK |
| Comparative example 2 | 5 mm | Present | Present | OK | NG | OK |
| Example 1 | 4 mm | Present | Present | OK | OK | OK |
| Example 2 | 3 mm | Present | Present | OK | OK | OK |
| Example 3 | 2 mm | Present | Present | OK | OK | OK |
| Example 4 | 1 mm | Present | Present | OK | OK | OK |
| Example 5 | 0.5 mm | Present | Present | OK | OK | OK |

In the batteries of Examples 5 and 6, the mesh layer is only formed on the positive electrode plate with a thicknesses of 20 μm and 3 μm, respectively. In the batteries of Examples 7 and 8, the mesh layer is only formed on the negative electrode plate with a thicknesses of 20 μm and μm, respectively.

As can be seen from Examples 5 to 8, the mesh layer formed on either the positive electrode plate or the negative electrode makes it possible to achieve stability of the battery when a nail passes through the battery, and does not affect the initial capacity and the life span of the battery. That is, although it is preferable to form the mesh layers on both of the positive electrode plate and the negative electrode plate in order to further improve stability, it is also possible to form the mesh layer on either the positive electrode plate or the negative electrode plate in consideration of a manufacturing cost and optimization of a battery system.

Meanwhile, a mesh on the mesh layer may be formed in a diamond shape. In this case, when one side of the mesh is excessively long, the active materials may pass through the mesh, which makes it difficult to prevent a short circuit by preventing the detachment of the active materials. Therefore, as the length of one side of the mesh becomes smaller, it is possible to effectively prevent the detachment of the active materials.

The following Table 2 summarizes the initial capacities of batteries, the nail penetration test results, and the life spans of the batteries after performing an upper limit test for the size of a mesh.

Mesh layers having a thickness of 5 μm are formed on both of the positive electrode plate and the negative electrode plate while adjusting only the size of a mesh. And, similar to Table 1, in a penetration test, a nail completely passes through a battery charged with a voltage of 4.35 V, and then it is checked whether combustion and explosion occur in the battery. If the combustion and the explosion do not occur in the battery, the penetration result of the battery is represented by "OK". On the other hand, if the combustion and the explosion occur in the battery, the penetration result of the battery is represented by "NG". Meanwhile, from the viewpoint of the life span of a battery, the battery is charged with 1 C and 4.2 V and is discharged with 1 C and 3 V. If the capacity of the battery that In the battery of Comparative example 1, mesh layers, in which the length of one side of the diamond-shaped mesh is 7 mm, are laminated on both of the positive electrode plate and the negative electrode plate.

In a battery of Comparative example 2, mesh layers, in which the length of one side of the diamond-shaped mesh is 5 mm, are laminated on both of the positive electrode plate and the negative electrode plate.

In batteries of Examples 1 to 5, mesh layers, in which the lengths of sides of the diamond-shaped meshes are respectively 4 mm, 3 mm, 2 mm, 1 mm, and 0.5 mm, are laminated on both of the positive electrode plate and the negative electrode plate.

When the length of one side of the mesh is equal to or more than 5 mm as in the batteries of Comparative examples 1 and 2, the active material is not effectively prevented from passing through the meshes when a nail passes through the battery, which results in the combustion and exposition of the battery.

When the length of one side of the mesh is less than 5 mm as in the batteries of Examples 1 to 5, however, the detachment of the active material is effectively prevented when a nail passes through the battery, so that a short circuit does not occur in the battery. As a result, the combustion and explosion of the battery do not occur.

Therefore, it is preferable that the length of one side of the mesh be less than 5 mm in order to prevent the detachment of the active material.

Next, a secondary battery including an electrode assembly according to an exemplary embodiment of the principles of the present invention will be described in detail according to an exemplary embodiment.

A secondary battery according to an embodiment of the principles of the present invention is constructed with an electrode assembly, a can for housing the electrode assembly, and a cap assembly for closing up an upper opening of the can.

As described above, the electrode assembly includes a positive electrode plate, a negative electrode plate, and a separator which is interposed between the positive electrode plate and the negative electrode plate to prevent a short circuit between the positive electrode plate and the negative electrode. Here, the electrode assembly is further constructed with a mesh layer which is wider than the electrode coating portions of either the positive electrode plate or the negative electrode plate to prevent the detachment of the electrode coating portion.

As described above, the mesh layer may be made from nylon, urethane, or a mixture thereof, and may have a thickness of approximately 3 μm to approximately 20 μm. In addition, the length of one side of a diamond-shaped mesh of the mesh layer may be less than 5 mm.

Meanwhile, the can and the cap assembly may have general configurations of the secondary battery.

That is, the can is made from aluminum or aluminum alloy and has about a rectangular parallelepiped shape. The electrode assembly is housed in the can through the upper opening portion, and the can serves as a container for the electrode assembly and an electrolyte. The can may also serve as a terminal.

A planar cap plate having a size and a shape similar to the upper opening portion of the can is provided in the cap assembly. A tube-shaped gasket is provided between the cap plate and an electrode terminal passing through the center of the cap plate to electrically insulate the cap plate from the electrode terminal. In addition, an insulating plate is disposed on a lower surface of the cap plate, and a terminal plate is provided on a lower surface of the insulating plate. A lower part of the electrode terminal is electrically connected to the terminal plate. A positive electrode tap extending from the positive electrode plate is welded to the lower surface of the cap plate, and a negative electrode tap which extends from the negative electrode plate and has a zigzag bent portion is welded to a lower end of the electrode terminal.

An electrolyte injection hole is formed on one side of the cap plate, and a stopper is provided to close the electrolyte injection hole after the electrolyte is injected. The stopper is formed by putting a ball-shaped basic material made from aluminum or aluminum alloy on the electrolyte injection hole and mechanically pressing the basic material against the electrolyte injection hole. The stopper is welded to the cap plate around the electrolyte injection hole in order to seal up the electrolyte injection hole. The cap assembly is coupled to the can by welding the periphery portion of the cap plate to the side wall of the upper opening portion of the can.

Next, the operations of the electrode assembly constructed as the embodiment of the principles of the invention and a secondary battery having the same will be described below.

As shown in FIG. 1, separator 30 is interposed between positive electrode plate 10 and negative electrode plate 20 to prevent a short circuit between positive electrode plate 10 and negative electrode plate 20, and mesh layer 40 made from nylon, urethane, or a mixture thereof is formed wider than electrode coating portions of either positive electrode plate 10 or negative electrode plate 20.

Since mesh layer 40 has high elasticity and flexibility, mesh layer 40 can prevent the electrode coating portions from being detached. In addition, as shown in FIG. 2, even when nail 50 passes through the battery, mesh layer 40 having high elasticity is extended to wrap the surface of nail 50. As a result, the stability of the battery is improved.

According to the above-described embodiments of the invention, the mesh layer is formed on the positive electrode plate or the negative electrode plate, which makes it possible to prevent the detachment of electrode coating portions when subjected to an external impact and thus improves the stability and reliability of a battery.

As described above, although the exemplary embodiments of the invention have been described above, the invention is not limited thereto. Therefore, it will be appreciated by those skilled in the art that various modifications and changes of the invention can be made without departing from the scope and spirit of the invention, the scope of which is defined in the appended claims and their equivalents.

What is claimed is:

1. An electrode assembly, comprising:
   a positive electrode plate and a negative electrode plate facing each other, each electrode plate comprising a respective electrode coating portion arranged between electrode non-coating portions which are disposed at opposite edge portions of the respective electrode plate, with the electrode coating portion being made from an electrode active material, and the electrode non-coating portions being the portions of the electrode plate that are not coated with the electrode active material;
   a separator electrically insulating the positive electrode plate and the negative electrode plate; and
   a mesh layer disposed exclusively between the separator and only one of the positive electrode plate and the negative electrode plate, and the mesh layer being wider than the electrode coating portion of said one electrode plate to prevent a detachment of the electrode coating portion from said one electrode plate, the mesh layer being in an immediate physical contact with the separator,
   edge portions of the mesh layer which extend over the electrode non-coating portions being adhered to the electrode non-coating portions, respectively, so that the mesh layer is coupled with said one electrode plate.

2. The electrode assembly according to claim 1, comprised of the mesh layer being made from nylon, urethane, or a mixture thereof.

3. The electrode assembly according to claim 1, comprised of the mesh layer having a thickness of approximately 3 μm to approximately 20 μm.

4. The electrode assembly according to claim 1, comprised of the mesh layer comprising meshes with diamond shapes.

5. The electrode assembly according to claim 4, comprised of the length of one side of the mesh in the mesh layer being less than approximately 5 mm.

6. The electrode assembly according to claim 1, further comprising an adhesive substance applied between the edge of the mesh layer and said one electrode plate, with the mesh layer being laminated on said one electrode plate.

7. The electrode assembly according to claim 1, further comprising a separator interposed between the positive electrode plate and the negative electrode plate, and the mesh layer contacting the separator by winding.

8. A secondary battery, comprising:
   an electrode assembly;
   a can; and
   a cap assembly, with the electrode assembly comprising:
      a positive electrode plate and a negative electrode plate facing each other, and comprising a respective electrode coating portion arranged between electrode non-coating portions which are disposed at opposite edge portions of the respective electrode plate, with the electrode coating portion being made from an electrode active material, and the electrode non-coating portions being the portions of the electrode plate that are not coated with the electrode active material;
      a separator electrically insulating the positive electrode plate and the negative electrode plate; and
      a mesh layer disposed exclusively between the separator and only one of the positive electrode plate and the negative electrode plate, and the mesh layer being wider than the electrode coating portion of said one electrode plate to prevent a detachment of the electrode coating portion from said one electrode plate, the mesh layer being in an immediate physical contact with the separator, edge portions of the mesh layer which extend over the electrode non-coating portions being adhered to the electrode non-coating portions, respectively, so that the mesh layer is coupled with said one electrode plate.

9. The secondary battery according to claim 8, comprised of the mesh layer being made from nylon, urethane, or a mixture thereof.

10. The secondary battery according to claim 8, comprised of the mesh layer having a thickness of approximately 3 μm to approximately 20 μm.

11. The secondary battery according to claim 8, comprised of the mesh layer comprising meshes with diamond shapes, with the length of one side of the mesh in the mesh layer being less than approximately 5 mm.

* * * * *